United States Patent [19]

Smith

[11] Patent Number: 4,499,666
[45] Date of Patent: Feb. 19, 1985

[54] UNIVERSAL FRAMING LAYOUT TOOL

[76] Inventor: Kenneth M. Smith, 1621 Belgrade Dr., Plano, Tex. 75023

[21] Appl. No.: 395,787

[22] Filed: Jul. 6, 1982

[51] Int. Cl.³ .................................................. G01B 3/04
[52] U.S. Cl. .................................. 33/174 B; 33/476; 33/494
[58] Field of Search ................. 33/174 G, 174 B, 464, 33/456, 476, 191, 483, 494, 474, 478, 499, 403

[56] References Cited

U.S. PATENT DOCUMENTS

| | | |
|---|---|---|
| 1,665,400 | 4/1928 | Bittner . |
| 2,187,087 | 1/1940 | Leary . |
| 2,466,919 | 4/1949 | Sykes .......................... 33/174 G X |
| 2,533,588 | 12/1950 | Kondor ........................... 33/174 G |
| 2,567,586 | 9/1951 | Werder . |
| 2,659,980 | 11/1953 | Dunn . |
| 2,713,203 | 7/1955 | Gottlieb . |
| 2,786,278 | 3/1957 | Bates ................................ 33/464 X |
| 3,090,533 | 5/1963 | Claey et al. ................. 33/174 G X |
| 3,169,320 | 2/1965 | Currie . |
| 3,665,612 | 5/1972 | Albright ............................ 33/174 B |
| 4,212,108 | 7/1980 | Jackson . |
| 4,301,596 | 11/1981 | Sedlock . |

*Primary Examiner*—William D. Martin, Jr.
*Attorney, Agent, or Firm*—Richards, Harris & Medlock

[57] ABSTRACT

A framing layout tool facilitates the accurate and quick layout of framing marking for a structure. A bidirectional measuring scale provides a means for measuring and marking the location of any size door or window opening. Window and door marking tabs are also positioned along the main bar of the tool for obtaining markings for window and door openings of predetermined widths. A channel marker extends from the edge of the tool and is of a predetermined width corresponding to the width of the channel. The channel marker includes a central opening for use in conjunction with the outer stud markers for marking studs with spacings greater than the equidistantly spaced stud markers. A plurality of stud markers corresponding in width to a stud are spaced equidistantly along one edge of the layout tool.

8 Claims, 10 Drawing Figures

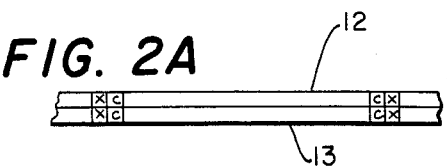
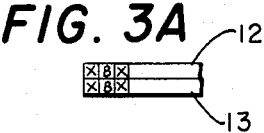
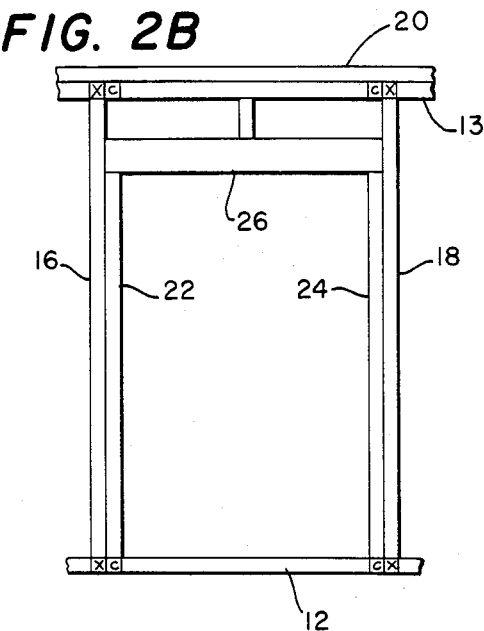
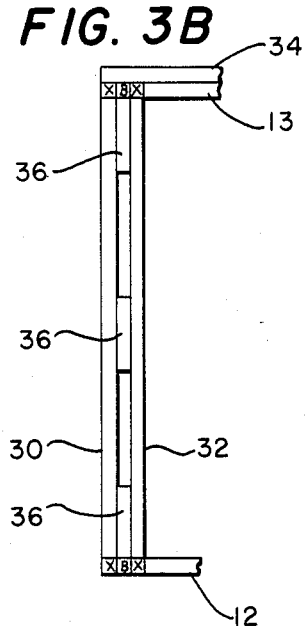
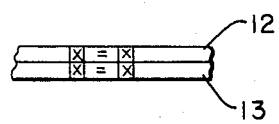
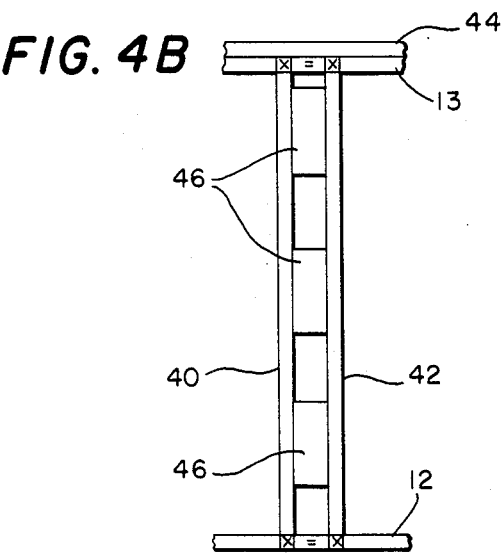
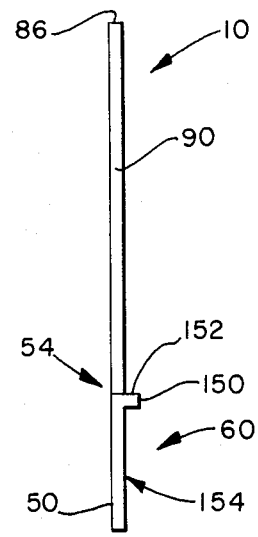

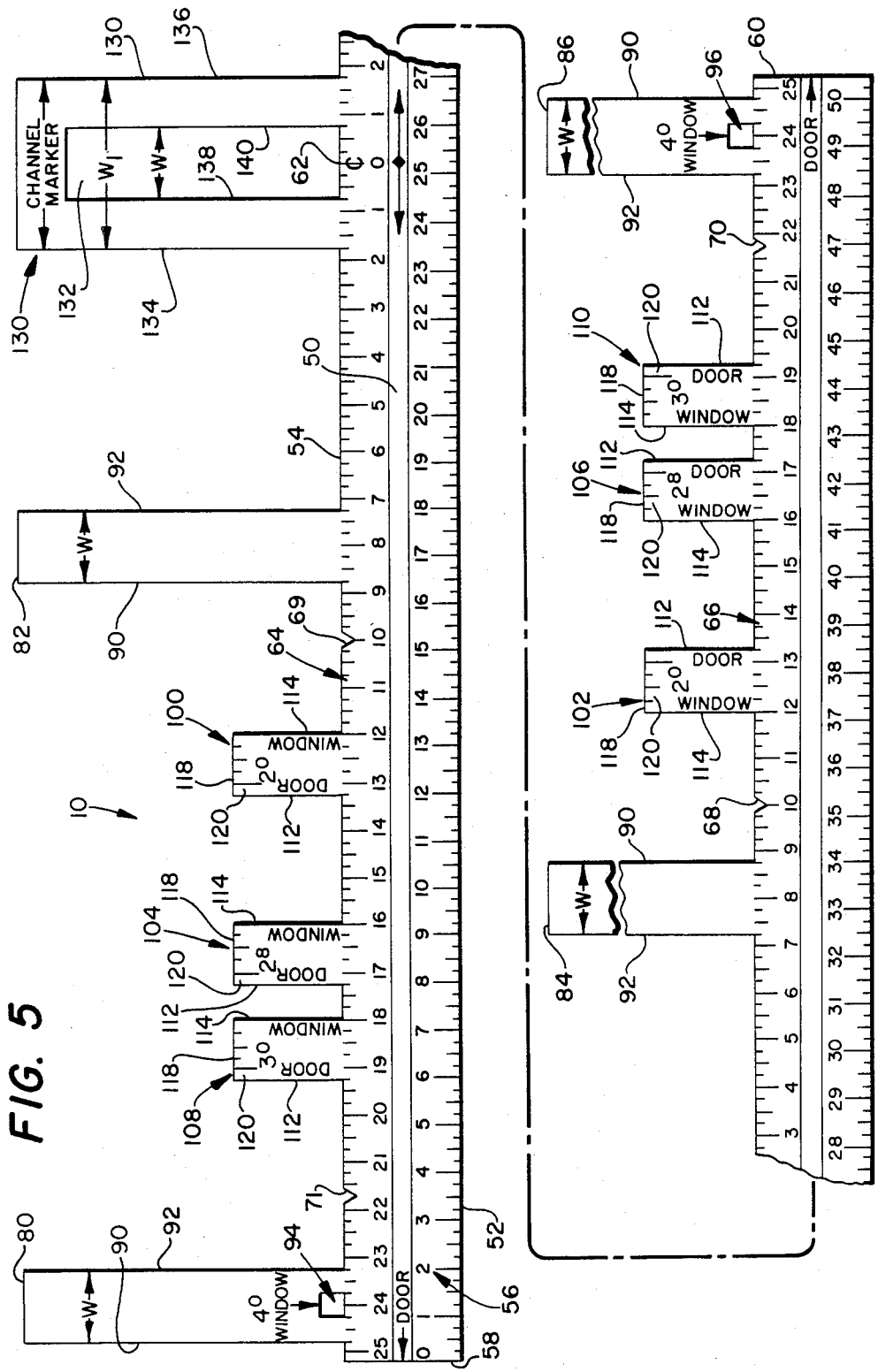

UNIVERSAL FRAMING LAYOUT TOOL

TECHNICAL FIELD

This invention relates to a carpentry tool for laying out framing dimensions for a structure, and more particularly to a tool for laying out framing dimensions for the location of doors, windows, channels, corners, studs, joists and rafters.

BACKGROUND ART

In constructing a building, a carpenter reads a set of architectural drawings to obtain the location of the framing layout for a building. The floor plans show the size and outline of the building, as well as the location and size of interior partitions, doors, windows and stairs. A carpenter interprets the floor plans to obtain the information for marking the window and door locations, channels, corners and studs on the base plates and overhead plates. The base plates and overhead plates may be marked using the box framing method or stick framing method. In box framing, the plates (2"×4") are turned on edge along the layout of the floor to provide a marking surface approximately 3" across. (The 2" × 4 is actually 1½" by 3½".) In the stick framing method, the base plates are nailed down to the floor along the framing layout, and the overhead plates are placed next to the base plates. The base plates and overhead plates present a marking surface 7" across. Considerable time and care must be taken by the carpenter laying out the framing to ensure that the markings are true to the architectural plans.

A number of carpentry tools have been developed to aid the carpenter in laying out the framing of a structure. These tools have helped to reduce the time required and improve the accuracy of measurements for both experienced and inexperienced carpenters to obtain measurements or markings for location of some framing elements, such as stud locations. However, a need exists for an improved framing layout tool to provide means for accurately and quickly translating the dimensions from an architectural drawing for a plurality of framing elements, particularly including markings for windows, doors, channels and corners.

SUMMARY OF THE INVENTION

In accordance with the present invention, an improved carpentry layout tool is provided for laying out framing dimensions. The present invention provides a complete framing layout tool to provide increased efficiencies in home building. A rigid, elongated main bar of a predetermined length has a straight edge along one elongated side and a plurality of marking guides extending from the opposite side. In the preferred embodiment of the present invention, the main bar extends a length of 4' and 2½". A linear measuring scale extends along the straight edge of the main bar from a zero point on one end, and the graduated markings may be in the U.S. system or metric system, or both. On the other elongated side of the main bar, linear dimensions are measured in both directions from a centerpoint on the tool in ascending order to the opposite ends of the tool.

Door and window marking tabs are used for quickly and accurately marking predetermined door and window openings of the most commonly used widths as well as oversized or undersized door or windows. In the preferred embodiment, these openings are 2', 2'8", 3' and 4'. The window and door tabs extend perpendicularly from an elongated edge of the bar and include one straight edge for marking a window and a second straight edge for marking a door. The width of the tab takes into account the 2½" rough opening allowance for finished trim for doors. In order to make allowances for oversized and undersized window and door openings, a linear measurement scale is marked on the end of the door and window tabs and corresponds to the scale along the main bar. Door and window markings could also be indicated by means of arrows or other indicia to show the location of the marks for predetermined sized window and door openings. The main bar extends beyond the outer two stud markers and allows space to mark a two and one-half inch rough finish out for the four foot door openings.

In accordance with another aspect of the invention, stud marking guides extend from the main bar at predetermined equidistant intervals, usually at 16" since studs are commonly spaced 16" apart. The stud marking guides may be of any predetermined length to mark a stud location across the base plates. In the preferred embodiment, the stud marking guide extends 6" from the main bar to facilitate use by both stick framers and box framers. Of course, the stud marking guides are of a predetermined width to correspond to the width of the stud, normally 1½".

In accordance with another aspect of the invention, a channel marker is provided as a pair of straight edges extending perpendicularly from the main bar and having a predetermined width corresponding to the width of a channel, normally 3½". In the preferred embodiment of the invention, the channel marker is a rectangular member with its elongated sides as the pair of straight edges and a center cut-out section having an opening corresponding to the width of studs, joists and rafters. The channel marker opening is usable in combination with the outer two stud markers on the tool to provide means for laying out framing on two foot centers.

In accordance with yet another aspect of the present invention, predetermined markings are also provided for centering the first stud along a section, so that the edge of each succeeding 4'×8' section of sheetrock will break in the center of each stud. The first stud marking is 15¼" from the end of the main bar and may be marked by a V-groove in the bar or any other suitable indicia. In addition, a predetermined mark at 3½" from the end of the main bar is provided for quick marking of a corner where a base plate overlaps another base plate.

In another embodiment of the present invention, a carpentry framing tool is provided with door and window tab markings extending from one edge of a main rule and no stud marking guides. As in the preferred embodiment, a linear measuring scale may be provided on one or both of the elongated sides of the rule for quick and accurate measurements.

BRIEF DESCRIPTION OF DRAWINGS

For a more complete understanding of the present invention and the advantages and features thereof, reference is now made to the accompanying Detailed Description taken in conjunction with the following figures in which:

FIG. 2 is a plan view of a base plate and overhead plate marked for a door opening;

FIG. 2B, is a side elevational view of a framed door opening assembled according to the layout of FIG. 2A;

FIG. 3A is a plan view of a base plate and overhead plate marked for a carrier;

FIG. 3B is a side elevational view of a corner assembled according to the layout of FIG. 3A;

FIG. 4A is a plan view of a base plate and overhead plate marked for a channel;

FIG. 4B is a side elevational view of a channel assembled according to the layout of FIG. 4A;

FIG. 5 s a plan view of the preferred embodiment of the framing layout tool of the present invention;

FIG. 6 is an end view of the framing layout tool of FIG. 5; and

DETAILED DESCRIPTION

Figure 1:
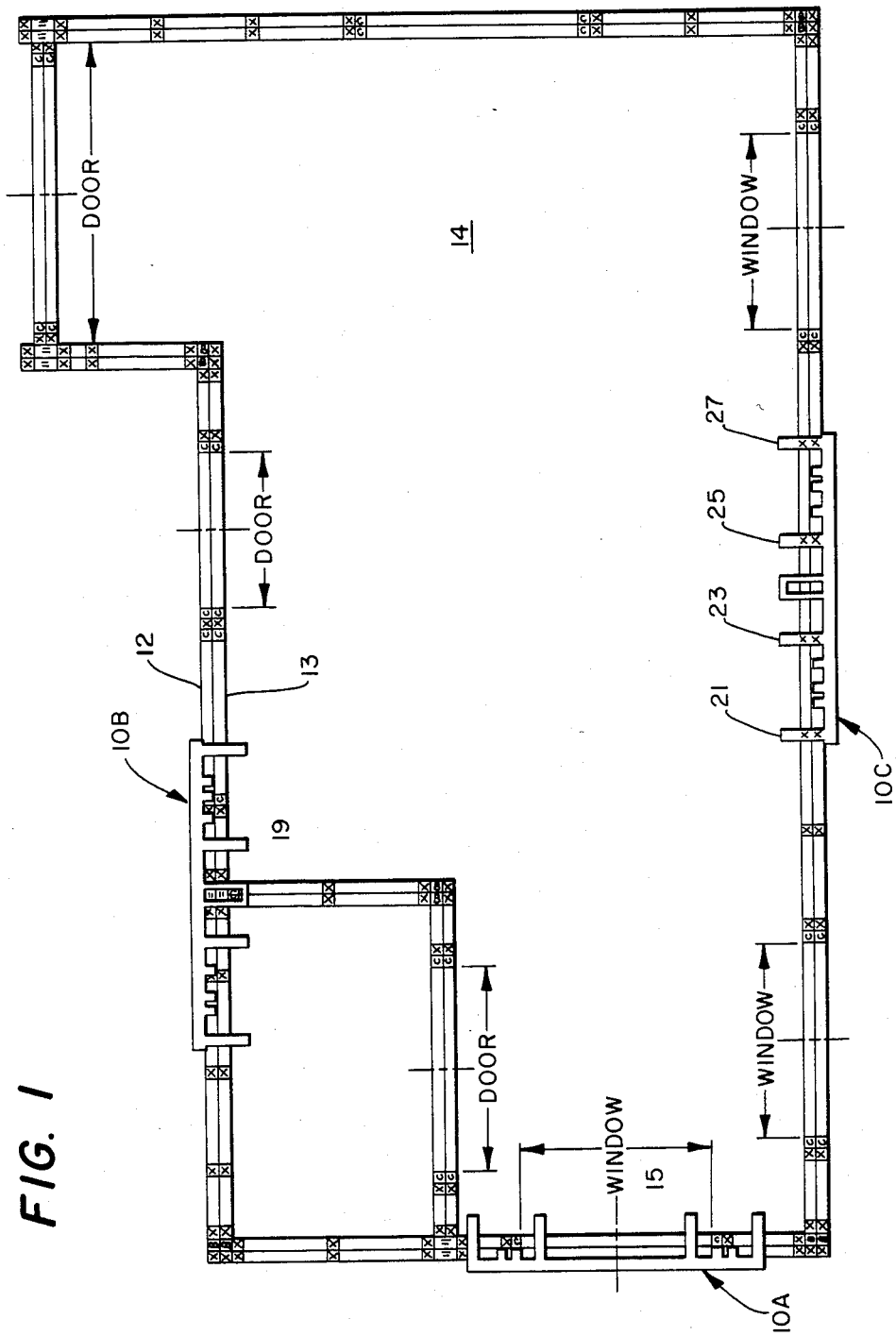
FIG. 1 is an architectural drawing of a floor plan, including stud locations and door and window locations, and showing the preferred and alternate embodiments of the present invention.

FIG. 1 illustrates three framing layout tools of the present invention, generally identified by the reference numerals 10A, B and C. The layout tool 10 is shown positioned along a base plate 12 and overhead plate 13 layed out side by side on edge along a floor 14 of a building. This method of laying out framing is generally known in the construction industry as box framing. The plates 12 and 13 are marked together, as shown, and present a distance across of approximately 3". The layout tool 10 may also be used in the stick framing method. In this method, the base plate is secured to the foundation, the overhead plate is then placed next to the base plate. The windows, doors, channels, corners and studs are marked across the width of the plates 12 and 13, approximately 7".

The base plate 12 and overhead plate 13 are marked with the layout tool 10 in accordance with the architectural floor plans of the building to mark the location of various framing elements: framing stud locations are marked with an "X", the location of windows and doors are marked with an "X" for the location of the stud and a "C" for the location of a cripple (see FIG. 2B), the location of a corner is marked with an "X-B-X" for a "stud-block-stud", and the location of a channel where two walls meet is marked with an "X=X" for a "stud-spacer-stud". A cripple or trimmer is a support stud under a header for supporting the header and adding strength to the side of the opening. A header is a horizontal structural member that supports the load over an opening, such as a door or window. A stud is one of a series of vertical wood or metal structural members in walls and partitions.

In FIG. 1, all the base plates 12 and overhead plates 13 have been laid out on the floor 14 in accordance with an architectural drawing of the structure to be built. The plates 12 and 13 are shown following laying out the framing locations with the tool 10. Framing layout tool 10A is illustrated in position at a center point 15 to mark a window 17. Tool 10B is shown in position to mark a channel 19, and tool 10C is illustrated in position for marking studs 21, 23, 25 and 27. The elements of tool 10 are illustrated in further detail in FIG. 5 and described hereinbelow.

FIGS. 2A, 3A, and 4A illustrate plan views of a door location, corner locations and a channel location on base plate 12 and overhead plate 13, respectively. FIGS. 2B, 3B, 4B are side elevation view illustrating the framing erected with the base plate 12 and overhead plate 13 in accordance with the markings in FIGS. 2A, 3A and 4A, respectively. In FIG. 2B, studs 16 and 18 are assembled between the line markings bracketing the "X" on the base plate 12 and overhead plate 13. A joining plate 20 ties sections of wall together. Cripples 22 and 24 are "2×4's" positioned upon the appropriate line markings bracketing the "C" upon the base plate 12 and extended to support a header 26, normally two 2"×6" pieces with spacing material therebetween.

In FIG. 3B, studs 30 and 32 are assembled between the appropriate layout markings "X" on the base plate 12 and overhead plate 13. A plate 34 serves to tie this section of wall to another section. A number of blocks 36 are positioned between the studs 30 and 32 for added structural support.

In FIG. 4B, studs 40 and 42 are assembled between stud location line markings bracketing the "X" on base plate 12 and overhead plate 13. A plate 44 serves to tie this section of wall to another section. Separation blocks 46 are positioned in the channel between the studs 40 and 42 for added structural support.

Referring now to FIG. 5, the layout tool 10 has an elongated rigid main bar 50 of a predetermined length. The length is determined by the predetermined openings for windows and doors. The main bar 50 in the preferred embodiment is a flat, rectangular member and has a first elongated side 52 and a second elongated side 54. The elongated side 52 has a straight edge and includes an ascending linear scale 56 extending from a zero point at a first end 58 of the bar 50 and extending to an opposite second end 60. In the preferred embodiment illustrated in FIG. 5, the main bar 50 is an elongated rectangle extending 4' 2½". This length allows for the marking of a standard 4' door, including 2½" rough opening allowance. Of course, the length of the main bar 50 and extent of scale 56 are not limited to the dimensions of the preferred embodiment and may be charged without departing from the spirit of the invention.

The second elongated side 54 of the main bar 50 has a zero centerpoint line 62, visually identified by the letter "C" on the line. Of course, the zero centerpoint 62 may be visually identified by any suitable means, such as a notch cut in the side 54 of the bar 50. A first linear measurement scale 64 extends in ascending order along the elongated side 54 from the centerpoint 62 to the first end 58 of the bar 50. A second linear measurement scale 66 extends in ascending order from the zero centerpoint 62 to the other end 60 of the bar 50. The bidirectional scales 64 and 66 provide a means for obtaining the measurements of any window and door openings from a center line for the window or door.

Stud locator marks 68 and 69 marked along the measurement scale 66 and 64 at a point 15¼" from the ends 60 and 58 of the bar 50. The marks 68 and 69 are identified by a V-groove cut in the elongated side 54 at that point. The stud locator marks 68 and 69 provide a fast and accurate method of marking the point where the first stud falls 15¼" from an inside corner for the standard layout for marking studs on 16 inch centers. By marking the first stud location 15¼" from the inside corner, the edge of the standard 4'×8' sections of sheetrock will break at the center of each stud. Corner marks 70 and 71 are located 3-½" from the ends 60 and 58 of the bar 50. The marks 70 and 71 are identified by a V-groove cut in the elongated side 54. The corner marks 70 and 71 are used to obtain a starting mark if a base plate intersects or overlaps another base plate. When one base plate overlaps or intersects another base plate, it is necessary to obtain the $3\frac{1}{2}''$ mark prior to obtaining the $15\frac{1}{4}''$ measurement for marking studs on 16" centers.

Four stud marking bars 80, 82, 84, and 86 are rectangular bars coplanar with bar 50 and extending from and perpendicular to the elongated side 54. Each of the stud marking bars 80, 82, 84 and 86 include a first elongated outer straight edge 90 (the edge outermost from the centerpoint 62) and a second elongated inner straight edge 92 (the innermost edge to the centerpoints 62). The straight edges 90 and 92 are separated a predetermined width "W" corresponding to the width of the studs, normally $1\frac{1}{2}''$. The stud markers 80, 82, 84 and 86 are spaced 16" apart along elongated side 54 for marking studs on 16" centers. The outermost stud marking bars 80 and 86 include rectangular apertures 94 and 96, respectively, at the 24" mark along scales 64 and 66, respectively. The marking apertures 94 and 96 may be of any suitable shape to allow means for making a mark along a baseplate for a 4-foot window marking, 48" across.

A plurality of pairs of window and door marking guides 100 and 102, 104 and 106, and 108 and 110 extend from and are perpendicular to the elongated side 54 and are coplanar with the bar 50. The first, second and third pairs of window and door marking guides, 100-102, 104-106, and 108-110, are rectangular and each have an outer straight edge 112 and inner straight edge 114. The straight edge 112 is the outermost edge from the centerpoint 62, and the straight edge 114 is closest to the centerpoint 62. The first pair of marking guides 100 and 102 are located on the bar 50 for obtaining markings for a 2' wide window or door. The inner straight edges 114 of the marking guides 100 and 102 are 24" apart and provide a means for initialling these locations along a base plate 12 and overhead plate 13 (See FIG. 1). The full length mark across the base plate 12 and overhead plate 13 is made by sliding the bar 50 along to a stud marking bar 80, 82, 84 and 86 and completing the marking with any suitable marking device, such as a pencil. The outer straight edges 112 extend exactly $1\frac{1}{4}''$ beyond the inner edge 114, so that the outer edges 112 provide a means for marking a 2' door with a standard $2\frac{1}{2}''$ allowance for finish trim. As illustrated in the preferred embodiment, the marking guide pairs 100 and 102 include indicia to indicate that it is a mark for a standard 2' door or window, and the edges 114 and 112 are suitably marked to illustrate the use of the appropriate edge of the marking guides 100 and 102 for quickly and accurately marking either a 2' window or door. Similarly, the pair of marking guides 104 and 106 are positioned along the side 54 at a point where the inner edges 114 are 32" apart for marking a standard 2' 8" window, and the outer edges 112 are $34\frac{1}{2}''$ apart for marking a standard 2' 8" door. Likewise, the pair of marking guides 108 and 110 have their inner side edges 114 spaced 36" apart for marking a 3' window, and the outer edges 112 spaced $38\frac{1}{2}''$ inches apart for marking a 3' door with $2\frac{1}{2}''$ for finish trim. The marking guides 104-106 and 108-110 also indicate visual markings for identifying the guides and the appropriately marked edges for marking a window or door. Each of the marking guides, 100, 102, 104, 106, 108 and 110 include a straight edge 118 parallel to the elongated side 54 and including a linear measurement scale 120 which is identical to the portion of the scale 64 or 66 along the side 54 below the straight edge 118. The additional linear measurement scale 120 provides a means for marking slightly oversized or undersized doors or windows.

Of course, standard sized windows and doors could be marked using the linear measurement scales 64 and 66 and other means for indicating the standard openings, such as notches cut into the edge or an arrow or other visual mark along with some indicia to indentify the mark with the window or door location. In such an arrangement, the pairs of marking guides 100-102, 104-106 and 108-110 need not be included as part of the tool 10. The marking guides 100-102, 104-106 and 108-110 provide a fast and accurate means for marking the initial marks for these dimensions.

A channel marking guide 130 having a central rectangular opening 132 is coplanar with and extends from the elongated sides 54 of the bar 50. The channel marking guide 130 is centered about the centerpoint 62. Channel marking guide 130 is of a predetermined width $W_1$ corresponding to the channel width, normally $3\frac{1}{2}$ inches. First and second straight edges 134 and 136 extend from the side 54 a predetermined distance for providing a marking rule across the base plate 12 and overhead plate 13 for the channel location. The rectangular opening 132 is equidistant between the stud marking guides 82 and 84, placing it 24" from the two outer stud marking guides 80 and 86. The rectangular opening 132 has straight edges 138 and 140 normal to the sides 54 to provide a means for marking studs on a 24" center. The rectangular opening 132 is of a width "W" that is identical to the width "W" of marking guides 80, 82, 84 and 86 and most studs, normally $1\frac{1}{2}''$.

Referring now to FIG. 6, the layout tool 10 includes a projecting rib 150 extending the length of the main bar 50. The rib 150 has a straight edge 152 aligned with the side 54 and extending normally to the planar surface 154 of the main bar 50. The rib 150 serves as a means to align the tool 10 along the base plate 12 for marking the locations of the framing elements.

Figure 7:
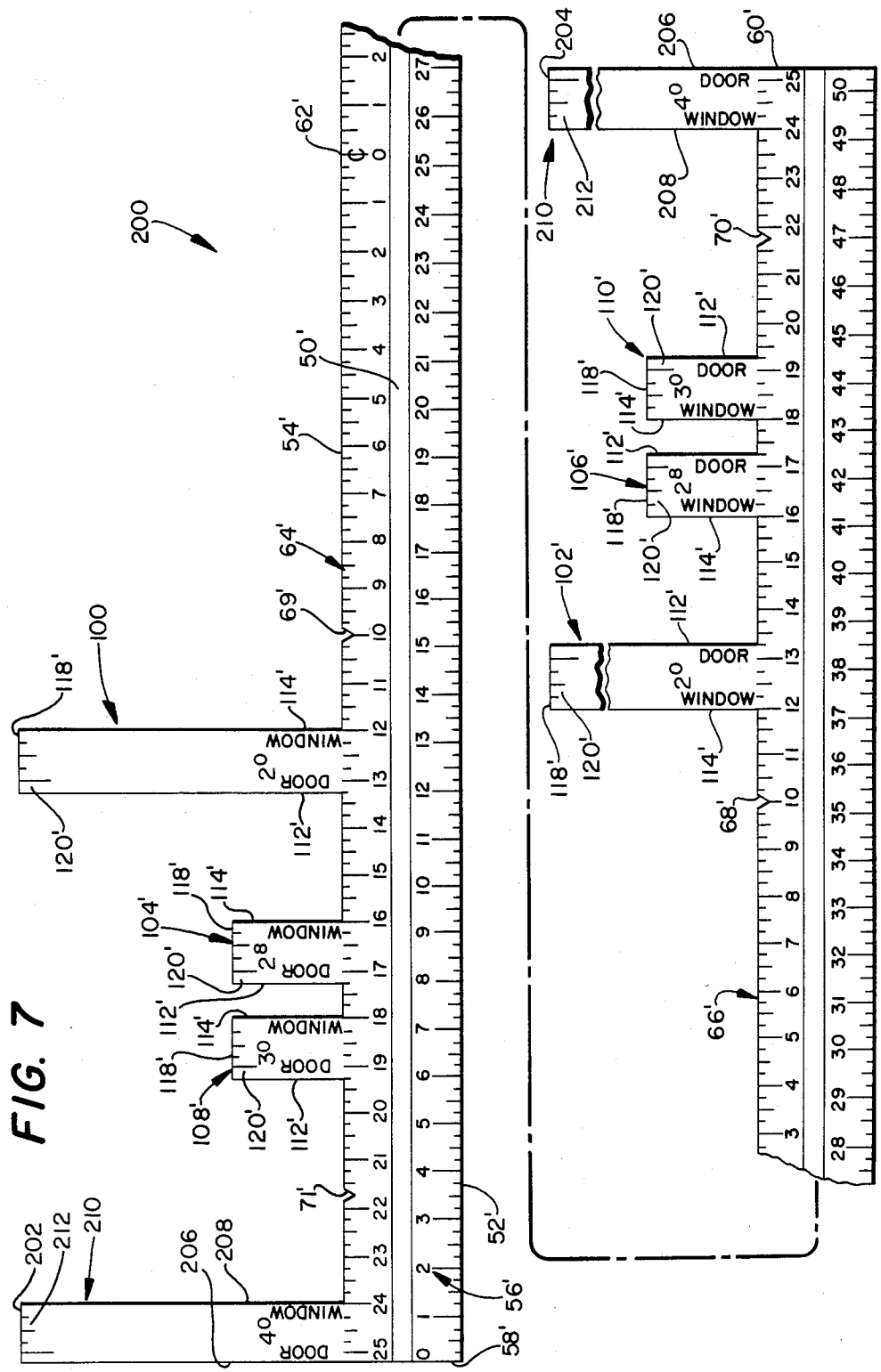
FIG. 7 is a plan view of an alternate embodiment of a framing layout tool of the present invention.

The framing layout tool 200 comprising an alternative embodiment of the present invention is illustrated in FIG. 7. Many of the component parts of the framing layout tool 200 are substantially identical in construction and function to component parts of the framing layout tool 10, described hereinabove. Such identical component parts are designated in FIG. 7 with the same reference numrals utilized hereinbefore in descriptions of the framing layout tool 10 but are differentiated therefrom by means of a prime (') designation.

A rigid, elongated main bar 50' includes a first elongated side 52' and second elongated side 54'. The first elongated side 52' inclues a linear measuring scale 56', arranged in ascending order from a zero point at a first end 58' to the opposite end 60' of the bar 50'. The elongated side 54' has a zero centerpoint 62', visually marked with a "C" across the line. A first linear measurement 64' is arranged in ascending order along the side 54' in ascending order from the zero point 62' to the end 58'. Similarly, a second linear measurement scale 66' is arranged in ascending order from the center point 62' to the end 60'.

Pairs of window and door marking guides 100'-102', 104'-106', 108'-110', and 202-204 are positioned at predetermined locations along the main bar 50' to provide a means for marking base plates 12 and overhead plates 13 for standard sized window and door openings. Undersized or oversized custom window and door openings may also be marked in another manner with tool 200, as explained below. The first pair of window and door marking guides 100′–102′ provide means for quickly and accurately marking 2′ doors and windows. The second pair of marking guides 104′–106′ provides a means for marking standard 2′ 8″ door and window openings. The third pair of marking guides 108′ and 110′ provides a means for marking 3-foot window and door openings. The fourth pair of marking guides 202 and 204 provides a means for quickly and accurately marking 4-foot windows and doors. The pairs of marking guides 100′–102′, 104′–106′, 108′–110′ include outer straight edges 112′ and inner straight edges 114′. The outer straight edges 112′ are the sides of the marking guides distal or outermost from the centerpoint 62′ and 1¼″ beyond the inner marking edge 112′ and provide a means for marking a standard door, including a 2½ inch allowance for finish trim. The edges 114′ are marked "Door" for visual identification. The inner straight edges 114′ are the sides of the marking guides proximate or closest to the centerpoint 62′. The edges 112′ are marked "Window" for quick identification of the mark. Similarly, the outer pair of marking guides 202 and 204 include an outer straight edge 206 and inner straight edge 208 for marking a 4′ window and door. The edge 206 is marked "Door" and edge 208 marked "Window" for quick visual identification of the marks.

The pairs of marking guides 100′–102′, 104′–106′, and 108′–110′ include a straight edge 118′ parallel to the elongated side 54′ of the main bar 50. The marking edges 118′ include a linear measuring scales 120′ corresponding to the markings along the linear measuring scale 64′ and 66′ between the respective outer straight edges 112′ and inner straight edges 114′ of the marking guides. Similarly, the marking guides 202 and 204 include a straight edge 210 parallel to the edge 54′ of the main bar 50′, and includes a linear measuring scale 212 corresponding to the section of the linear measuring scales 64′ or 66′ between the outer measuring edge 206 and inner measuring edge 208.

Of course, as stated above for tool 10, tool 200 could also be constructed without marking guides 100′–102′, 104′–106′, 108′–110′ and 202–204. In such an arrangement, the linear measuring scales 64′ and 66′ could be used with indicia indicating standard sized window or door opening dimensions, such as an arrow labeled with appropriate information to identify the mark.

In operation, the framing layout tool 10 provides a tool to enable a carpenter to accurately and quickly mark the location of many different framing elements from the dimension called for in an architectural plan. Architectural plan drawings generally indicate the location of windows and doors with a center line mark and the width of the door or window opening. The linear measuring scale 56 of tool 10 (or tool 200) may be utilized in obtaining the centerpoint marking of the window (or door) along a base plate 12 and overhead plate 13. The centerpoint 62 of the tool 10 is then placed upon the centerpoint for the window (or door), and the carpenter uses the inner straight edges 114 of the appropriate paired marking guides, 100–102, 104–106, or 108–110, to obtain the window dimension markings without further calculation or movement of the layout tool 10. (See tool 10A, FIG. 1). For example, the carpenter places the centerpoint 62 upon the marking along the base plate for the centerpoint or center line of the window. To obtain the precise location for the window markings, the tool 10 is used to create a mark along the lines 114 of the marking guides 108 and 110 for the inside dimension of the 3-foot window. Stud marking guides may then be used to obtain the extended mark or line across both the base plate 12 and overhead plate 13. An "X" may be placed between the marking for a stud and a "C" for the location of a cripple. (See FIG. 2).

The layout tool 10 (or tool 200) is similarly used to obtain the dimensions for a door opening. The layout tool 10 is placed with the centerpoint 62 upon the centerpoint marking for the door obtained by using the tool 10. In this example, the door opening to be marked is a standard 3′ door. The carpenter marks the outside measuring edges 112 of the pair of marking guides 108 and 110 to obtain the inner dimensions for a 3-foot door, whereby the tool 10 automatically provides the allowance for the 2½″ for trim for the door.

The layout tool 10 may also be utilized to obtain markings for studs, joists and rafters on either 16-inch or 24-inch centers. The main bar 50 is placed upon the sole or base plate 12 and overhead plate 13. The first stud location is taken from the dimensions on the architectural drawing. Subsequent stud locations are then made using the stud marking bars 80, 82, 84 and 86, if the studs are positioned at 16-inch centers. The first stud location is placed at the inside corner of a wall, and the first mark may be obtained by using the first stud location marks 68 or 69 of the tool 10 and subsequent stud markings are obtained in the manner described above. If the base plates 12 overlap, the tool 10 may be utilized to obtain the precise marking for the width of the overlapping base plates 12 by using either of the corner marks 70 and 71. If the architectural plans call for studs, joints, or rafters on 2′ centers, the outer stud markers 80 and 86 are used in conjunction with the channel opening 132 of channel marker 130 to obtain these framing markings in a manner similar to that described above for 16-inch centers.

Although preferred embodiments of the invention have been illustrated in the accompanying drawings described in the foregoing description, it will be understood that the invention is not limited to the embodiments disclosed, but is capable of numerous rearrangements, modifications and substitutions of parts and elements without departing from the spirit of the invention.

I claim:

1. A framing layout tool for use in laying out the location of framing elements along a base plate and overhead plate from achitectural plan drawings for a building, comprising:
   a planar, rectangular-shaped main bar having a straight edge as a first elongated side of said bar;
   at least one pair of window and door marking guides extending from and coplanar with a second elongated side, said pair of window and door marking guides being spaced equidistantly from the centerpoint of said main bar a predetermined distance for marking window and door locations, said marking guides having a first straight marking edge normal to said bar for marking a window and a second straight marking edge normal to said bar for marking a door location;
   at least one pair of elongated stud marking guides extending normal from and coplanar with said second elongated side of said main bar, said pair of stud marking guides being spaced a predetermined distance apart for marking stud locations; and
   a channel marking guide extending normal from said second elongated side, said channel marking guide being rectangular and having a predetermined width and further including a central rectangular opening of a predetermined width corresponding to the width of a stud.

2. A framing layout tool for use in laying out location of framing elements along a base plate and overhead plate from an architectural plan drawing for a building:
   a planar, rectangular main bar having first and second elongated sides, said first elongated side being a straight edge having a linear measuring scale extending longitudinally along said first side and ascending from a zero point at a first end to a second opposite end;
   a bidirectional linear measuring scale extending along said second elongated side, a first portion of said bidirectional scale ascending from a zero centerpoint to said first end and a second portion of said bidirectional scale ascending from said zero centerpoint to said opposite second end; and
   a plurality of pairs of window and door marking guides located at predetermined positions along said second elongated side, each of said window marking guides and each of said door marking guides being a pair of indicators spaced equidistantly from said centerpoint, whereby said linear measuring scale is a means for locating the centerpoint of a window or door location along a base plate and overhead plate and said window and door marking guides indicators and means for locating the width of the door or window from the centerpoint mark.

3. A framing layout tool for use in laying out the location of framing elements along a base plate and overhead plate from an architectural plan drawing for a building:
   a planar, rectangular main bar having first and second elongated sides, said first elongated side being a straight edge having a linear measuring scale extending longitudinally along said first side and ascending from a zero point at a first end to a second opposite end;
   a bidirectional linear measuring scale extending along said second elongated side, a first portion of said bidirectional scale ascending from a zero centerpoint to said first end and the second portion ascending from said zero centerpoint to said opposite second end;
   a plurality of pairs of windows and door marking tabs located a predetermined position along said second elongated side corresponding to standard sized openings of windows and doors, each of said tabs being rectangular in shape and extending normal from said second side and being coplanar with said main bar, said tabs having a first straight edge of said rectangular tab normal to said second side and closest to said centerpoint as a first marking edge for a window opening and the second straight edge of said rectangle normal to said second side and furthest from said centerpoint as a second marking edge for a door having same opening at the window of said tab, said marking tab having a predetermined width between first and second marking edges corresponding to the added space required on each side of the door for finish work;
   a plurality of elongated stud marking guides equidistantly spaced along said second side of said main bar corresponding to a standard distance between stud locations, said stud marking guides being rectangular in shape and extending normal to said second side and coplanar with said bar, said rectangular stud guides having a width equal to the width of a stud; and
   a channel marking guide extending from and coplanar with said main bar and normal to said second side, said channel marking guide being rectangular in shape and having a width equal to a standard channel.

4. The framing layout tool of claim 3, wherein said channel marking guide is centered about said centerpoint, said channel marking guide having a rectangular opening centered about said centerpoint, said rectangular having a width equal to said stud marking guides and said rectangular opening is spaced a predetermined distance from at least one of said stud marking guides corresponding to an alternate distance for locating studs, whereby studs may be marked that are located on different centers.

5. The framing layout tool of claim 3, and further comprising:
   means for visually marking two first corner marks a predetermined distance from said first and second ends of the tool.

6. The framing layout tool of claim 3, and further comprising:
   means for visually marking two first stud location marks a predetermined distance from said first and second ends of the tool, whereby the first stud location from a corner is located with the tool.

7. A framing layout tool for use in laying out the location of framing elements along a base plate and overhead plate from architectural plan drawings for a building, comprising:
   a planar, rectangular-shaped main bar having a straight edge as a first elongated side of said bar;
   at least one pair of window and door marking guides extending from and coplanar with a second elongated side, said pair of window and door marking guides being spaced equidistantly from the centerpoint of said main bar a predetermined distance for marking window and door locations, said marking guides having a first straight marking edge normal to said bar for marking a window and a second straight marking edge normal to said bar for marking a door location;
   at least one pair of elongated stud marking guides extending normal from and coplanar with said second elongated side of said main bar, said pair of stud marking guides being spaced a predetermined distance apart for marking stud locations;
   a bidirectional linear measurement scale ascending from a centerpoint on said second elongated side to the opposite ends of said main bar; and
   a unidirectional linear measurement scale ascending along said first elongated side from a zero point on one end of said bar to the opposite end of said bar.

8. A framing layout tool for use in laying out the location of framing elements along a base plate and overhead plate from architectural plan drawings for a building, comprising:
   a planar, rectangular-shaped main bar having a straight edge as a first elongated side of said bar;
   at least one pair of window and door marking guides extending from and coplanar with a second elongated side, said pair of window and door marking guides being spaced equidistantly from the centerpoint of said main bar a predetermined distance for marking window and door locations, said marking guides having a first straight marking edge normal to said bar for marking a window and a second straight marking edge normal to said bar for marking a door location;

at least one pair of elongated stud marking guides extending normal from and coplanar with said second elongated side of said main bar, said pair of stud marking guides being spaced a predetermined distance apart for marking stud locations;

a bidirectional linear measurement scale ascending from a centerpoint on said second elongated side to the opposite ends of said main bar;

straight edge along the end of each said window and door marking guides between said first and second marking edges and parallel to said second elongated side; and a linear measuring scale along said straight edge of said window and door marking guide, said linear measuring scale corresponding to a portion of said bidirectional linear measuring scale between said marking edges of said window and door guides.

* * * * *

UNITED STATES PATENT AND TRADEMARK OFFICE
CERTIFICATE OF CORRECTION

PATENT NO. :   4,499,666
DATED      :   February 19, 1985
INVENTOR(S):   Kenneth M. Smith It is certified that error appears in the above-identified patent and that said Letters Patent is hereby corrected as shown below:

Column 1, line 25, change "4" to --4"--.

Column 3, line 1, change "FIG. 2" to --FIG. 2A--.

Column 3, line 3, delete "," after "2B".

Column 3, line 13, change "s" to --is--.

Claim 2, line 1, after "out" insert --the--.

Signed and Sealed this

Twenty-third Day of July 1985

[SEAL]

Attest:

DONALD J. QUIGG

*Attesting Officer*   Acting Commissioner of Patents and Trademarks